Figure 1:
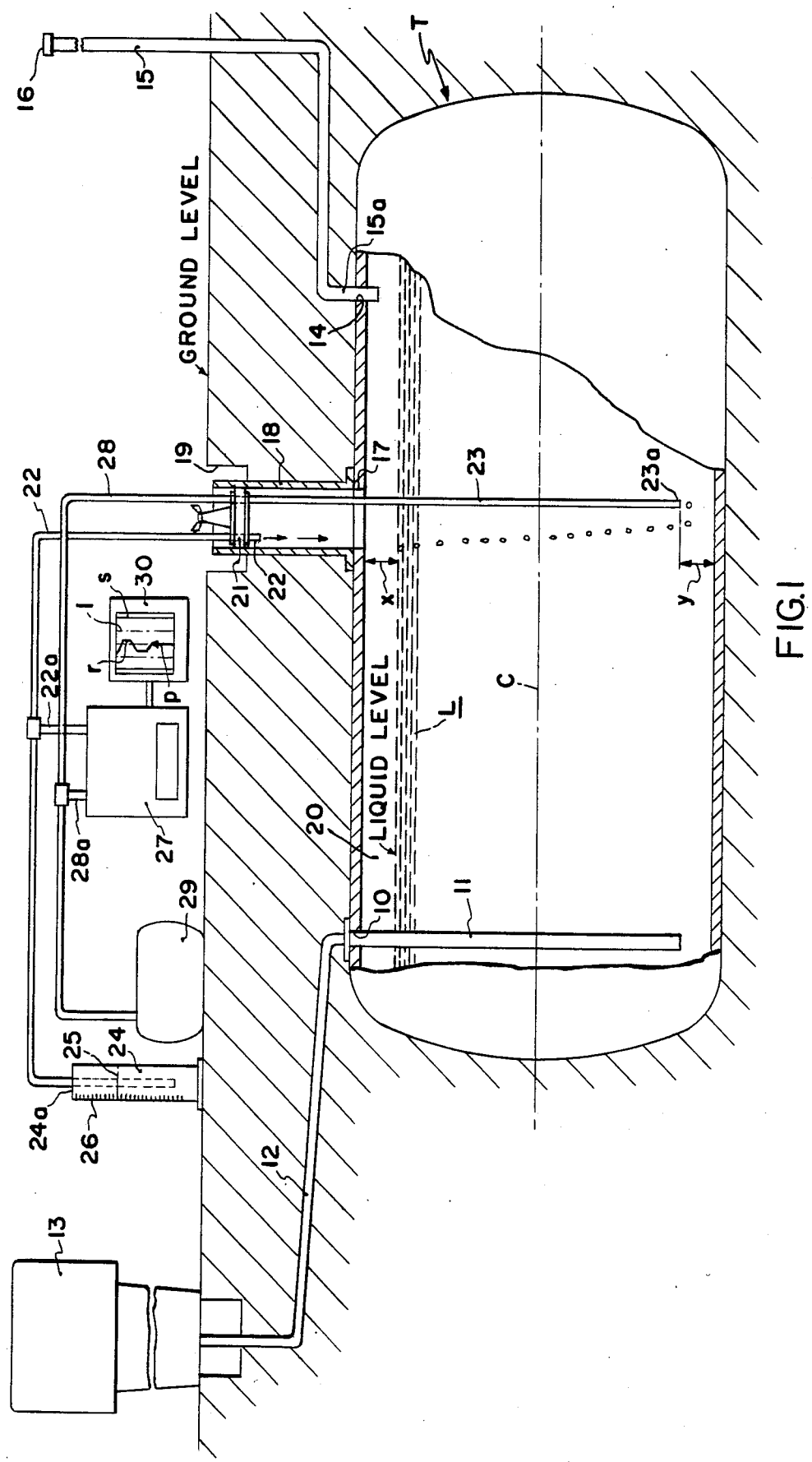

United States Patent [19]

Horner

[11] Patent Number: 4,649,739

[45] Date of Patent: Mar. 17, 1987

[54] METHOD OF DETECTING LEAKS IN LIQUID STORAGE TANKS

[76] Inventor: John A. Horner, 387 River Dr., Lagoon Beach, Bay City, Mich. 48706

[21] Appl. No.: 806,628

[22] Filed: Dec. 9, 1985

[51] Int. Cl.⁴ .............................................. G01M 3/30
[52] U.S. Cl. ........................................ 73/49.2; 73/302
[58] Field of Search ................................. 73/49.2, 302

[56] References Cited

U.S. PATENT DOCUMENTS

| | | | |
|---|---|---|---|
| 517,388 | 3/1894 | Linder | 374/202 |
| 1,598,571 | 8/1926 | Fox et al. | 73/302 |
| 1,720,159 | 7/1929 | Willmann | 73/302 |
| 1,819,655 | 8/1931 | Mohr | 73/302 |
| 2,012,511 | 8/1935 | Hubbard | 73/302 |
| 2,853,874 | 9/1958 | Mennesson | 73/40 |
| 3,499,580 | 3/1970 | Smith | 73/302 X |
| 3,580,055 | 5/1971 | White | 73/49.2 |
| 3,587,316 | 6/1971 | Kapteyn | 73/302 |
| 3,726,141 | 4/1973 | Bremer | 374/202 |
| 3,818,752 | 6/1974 | Lindeberg | 73/49.2 |
| 3,961,532 | 6/1976 | Kukuruzinski | 374/190 |
| 4,006,636 | 2/1977 | Holmen | 73/302 |
| 4,108,002 | 8/1978 | Rowe et al. | 374/190 |
| 4,186,591 | 2/1980 | Mooney | 73/49.2 |
| 4,300,388 | 11/1981 | Hansel et al. | 73/49.2 |
| 4,362,403 | 12/1982 | Mooney | 374/4 |
| 4,472,969 | 9/1984 | Templin | 73/313 |
| 4,474,054 | 10/1984 | Ainlay | 73/49.2 |
| 4,571,987 | 2/1986 | Horner | 73/49.2 |

FOREIGN PATENT DOCUMENTS

| | | | |
|---|---|---|---|
| 1142084 | 1/1963 | Fed. Rep. of Germany | 73/49.2 |
| 1166720 | 6/1958 | France | 73/302 |
| 2520506 | 7/1983 | France | 73/49.2 |
| 588691 | 6/1977 | Switzerland | 73/49.2 |

OTHER PUBLICATIONS

Horner Creative Metals, Inc., EZY-CHEK Leak Detection System.

Primary Examiner—Stewart J. Levy
Assistant Examiner—Joseph W. Roskos
Attorney, Agent, or Firm—Learman & McCulloch

[57] ABSTRACT

A method of detecting leaks in hazardous liquid tanks, such as underground gasoline tanks connected with a fuel pump withdrawal system, and having a fuel supply line and a vent pipe to atmosphere. The tank is filled incompletely such that there is a space or volume left in the tank above the liquid level in the tank. The space above the liquid level is then filled with a gas under pressure, which maintains a predetermined regulated pressure on the liquid in the tank from one end of the tank to the other. Next, a continuous stream of gas is forced into the liquid near the bottom of the tank to reflect the resistance or back pressure to gas introduction as influenced by the head of the liquid in the tank. The static pressure of the gas in the space above the liquid, to which the gas proceeds in a continuous flow of bubbles, is balanced as a reference pressure against the pressure required to continuously bubble air at the predetermined depth, and any differential variation is noted on an indicator such as a chart recorder.

14 Claims, 1 Drawing Figure

METHOD OF DETECTING LEAKS IN LIQUID STORAGE TANKS

BACKGROUND OF THE INVENTION

This invention relates generally to leak detection methods which are employed with underground tanks for storing gasoline at petroleum products service stations, and tanks in other installations, and more particularly to a leak testing method which permits such a station operator, for instance, to meet the high standards with respect to leak management set by applicable statutes, or by fire marshals, in many states.

Environmental standards in many states today, permit a maximum leakage of no more than a negligible 0.05 gallons per hour from large storage tank holding hazardous liquids. It is conventional for approved operators, using approved leak detection equipment, to periodically check or inspect such storage tanks, which may consist of a 26 foot long cylindrical tank having a diameter of 8 feet, and holding perhaps 10,000 gallons of gasoline. Normally, private equipment operators with portable equipment are employed by station operators and others to periodically test their tanks for leaks. Older methods simply measured any loss in air pressure at the top of the tank but were not sufficiently accurate. Present day leak detectors are typically of the hydrostatic, temperature-compensated variety. One method popularly used is to overfill the tank and monitor air pressure changes (either air bubbling back pressure or regulated pressure, applied to a stand pipe's liquid surface), while at the same time sensing the temperature of the liquid in the tank, because, when the temperature of the liquid changes, the volume of liquid also changes, and it is necessary to compensate for temperature change when this method is used. The problem with seeking to compensate for temperature change in gauging a liquid level differential is that the temperature of the various strata of liquid in the tank differs, so that any temperature reading taken at one location in a tank is not accurate for all of the liquid in the tank. Thus, taking an averaged temperature and correcting for temperature change, creates considerable problems for the testing equipment and may not always provide the accuracy which is deemed necessary for safety. The equipment described in some of the following prior art patents is of this type:

| | | | |
|---|---|---|---|
| 1,598,571 | Fox et al | 4,006,636 | Hohmen |
| 3,580,055 | White | 4,186,591 | Mooney |
| 3,587,316 | Kapteyn | 4,300,388 | Hansel et al |
| 3,818,752 | Lindeberg | | |

SUMMARY OF THE INVENTION

One of the prime objects of the present invention is to provide a more reliable and precise method of testing which eliminates temperature change and vaporization change as factors for which there must be compensation. The new method of detecting leaks involves filling the tank incompletely such that there is a space or volume left in the tank above the liquid level in the tank. The space above the liquid level is then filled with a gas under pressure, which maintains a predetermined regulated pressure on the liquid in the tank from one end of the tank to the other. Next, a continuous stream of gas is forced into the liquid near the bottom of the tank to reflect the resistance or back pressure to gas introduction as influenced by the head of the liquid in the tank. The static pressure of the gas in the space above the liquid to which the gas proceeds in a continuous flow of bubbles, is balanced as a reference pressure against the pressure required to continuously bubble air at the predetermined depth, and any differential variation is noted on an indicator such as a chart recorder. For example, if there is a leak in the tank, the volume of liquid in the tank is reduced, the head of liquid is less, and the pressure required to produce the flow of gas bubbles is less. This method need not consider the fact that the temperature of the liquid in the tank is stratified, and varies with ground conditions.

Another object of the invention is to provide a leak detection system which is fast and accurate, as well as versatile.

Still another object of the invention is to provide a method of determining the integrity of an underground storage tank for volatile petroleum products in commercial service stations, private auto and truck fleet fueling installations, and petroleum bulk storage plants, and for other liquid storage tanks, which is able to use relatively simple detection equipment employing simpler procedures than those now in use.

Still another object of the invention is to provide a method of efficiently detecting unacceptable leaks in underground and other storage tanks to enhance environmental protection, and minimize the leakage losses of valuable product, as well as the possible damage which might result from a fire, for example.

Still another object of the invention is to provide a more certain method of measuring the loss of valuable and hazardous liquid from underground storage tanks which, of course, cannot be visually inspected, so that corrective steps may be promptly taken.

Still a further object of the invention is to provide a method which is not affected by bulging of the tank ends due to high static pressures within the tank or flexing of the tank ends due to vibrations, and which permits testing in a manner to minimize down-time and loss of use of the tank.

Other objects and advantages of the invention will become apparent with reference to the accompanying drawings.

IN THE DRAWINGS

FIG. 1 is a schematic, sectional, elevational view showing, for purposes of illustration, an underground tank in place in the ground and illustrating the testing equipment used, in testing position.

The typical underground tank, generally designated T, is a steel cylindrical tank which has an opening 10 provided in its upper surface to admit a sealed fuel removal pipe 11, which is connected by means of a conduit 12 to a gasoline pump 13 which is operable to draw liquid from the ground-embedded tank T and dispense it in the usual manner to vehicle fuel tanks. A second opening 14 is provided in the upper end of the tank to admit the lower end 15a of a vent pipe 15 to the upper end of the tank T. The vent pipe 15 is usually open at its upper end to prevent the build-up of undue vapor in tank T, but is shown as closed by a plug 16 in FIG. 1 for purposes of the testing procedure. The conduit 12 is also normally sealed from the atmosphere during the test. A final opening in tank T is provided at 17, communicating with a fill pipe 18 which extends to enter a well 19 provided at ground level. Normally, when the tank T is in normal use and not being tested, the upper end of fill sleeve 18 is tightly sealed with insertion of a plumber's plug or other suitable, radially expandable seal.

The tank T is filled prior to the test procedure to a liquid level which leaves a space preferably varying from 1 inch to 12 inches in height at 20. This space normally, of course, is saturated with gasoline vapor which creates a pressure within the tank which does not vary with the volume of the liquid in the tank. When the volume of the vapor is reduced by admitting liquid to the tank, some of the vapor will condense to a liquid, and, if the volume is increased by withdrawal of some of the liquid, some of the liquid will vaporize, but the vapor pressure remains constant and its value depends only upon the material and the temperature. In this respect the saturated vapor behaves quite differently from an ideal gas acting in accordance with Boyle's law.

For test purposes, a plumber's plug 21, which admits an air tube 22 to the sleeve 18, and further passes a bubble tube 23 through the sleeve and opening 17 to a predetermined depth in the liquid L in tank T, is inserted and radially expanded to seal the upper end of sleeve 18. The opposite end of tube 22 is received within a graduated, liquid (i.e., water) containing stand pipe 24, with the lower end of tube 22 maintained below liquid level 25. The upper end of stand pipe 24 which functions as a bleed regulator is open as at 24a to atmosphere to permit air bubbles to egress, and graduations 26 are provided which measure the level of liquid maintained in the pipe 24. The level of liquid is maintained at a point such as to permit the continuous flow of bubbles from tube 23 to atmosphere without increasing the pressure in space 20. As will later be explained, a branch pipe 22a leads to a control center 27 which includes a differential pressure transducer. Bubble tube 23 connects with a pipe 28 communicating with a source of air 29 under a regulated constant pressure, which can be connected with a suitable air compressor. A branch pipe 28a also leads from pipe 28 to the control center 27. Because bubble tube 23 extends to a depth near the lower end of tank T, there will be a resistance to continuous flow, air pressure bubbling which is directly proportional to the head of liquid in the tank at the level of the outlet end 23a of tube 23. Any change in the pressure required to maintain a continuous stream of bubbles is instantly reflected in the pressure of the air in branch tube 22a and is picked up by the pressure transducer. This change is balanced against the pressure maintained in the space 20 and lines 22 and 22a as a reference, and any changes are noted over the period of test which normally will be of an hour's duration. With a pressure maintained in the space 20, smaller changes can be detected because the composite head or weight being measured at outlet 23a is a function of the pressure in space 20 plus the head of liquid above outlet 23a. Changes in weight of the liquid above outlet 23a of as little as 0.000036 pounds, can be detected. Moreover, if the pressure in space 20 changes (as with a change in barometric pressure), the head being measured at 23a varies accordingly. Since it is pressure differential which is being monitored by the transducer, the change has no effect. High ground water table conditions further are prevented by the pressure in space 20 from entering the tank T and masking a loss of gasoline.

The transducer in the control center 27 may be of the character disclosed in U.S. Pat. No. 4,006,636 which is of the diaphragm type. Preferably, however, the pressure transducer used at the control center 27 is of the helical Bourdon tube type and may be the quartz pressure transducer which utilizes a rotatable Bourdon tube within a pressurized casing, to sense a differential pressure. The pipe 28a connects to the open end of the Bourdon tube which reacts to a decreased pressure to rotate a mirror whose deflection is optically sensed. The pipe 22a connects to the closed and sealed interior of a casing housing the Bourdon tube so that the pressure inside the casing acts in opposition to the pressure in the Bourdon tube. The transducer modulates or controls the voltage of an electrical power supply, with which it is connected, with movement of the Bourdon tube. Such transducers, which typically operate when connected to a 12 volt, direct current power source, are manufactured by Mensor Corporation of San Marcos, Tex., and are commercially available.

The pressure differential is translated to an output voltage or signal which varies according to the amplitude of the pressure differential at control center 27, and which is electronically filtered and amplified several thousand times. The signal is translated to pen movement in a strip chart recorder or indicator 30. The strip chart recorder is also commercially available and may, for example, be a strip chart recorder of the type manufactured by Dianachart Inc. of Rockaway, N.J.

The input to recorder 30 modulates or controls an electrically driven pen drive motor or device (which is connected with a suitable power supply) to translate any variation in input voltage or signal to proportional mechanical movement of the pen of the recorder with respect to a chart reference line in the usual manner.

THE OPERATION

The vertical center C of tank T is located (with a suitable depth gauge stick or the like) and the outlet of the bubble tube 23 is vertically positioned at a location a distance below the vertical center C of tank T, which is equal to the depth of the liquid above the center. This procedure is followed because the tank is cross-sectionally a cylinder and, for purposes of applying pressure to the same cross-sectional area, the depth y should equal the depth of space x. Normally the distance x will be closer to 1 inch than to 12 inches for sensitivity purposes, and it should be remembered that changes in the nature of 0.001 inches in liquid volume are being sensed with the differential pressure transducer at control center 27, which measures any change in the pressure of tube 22a versus the pressure in tube 28a. The system is a low pressure system wherein typical pressures in the space 20 and tube 23 may be two p.s.i. Any slight leakage indicated by any differential pressure change is translated by the transducer into an amplified electrical output signal whose magnitude is translated by the linear potentiometer or control driving the pen P operating on the vertically lined (at 1) chart of the vertically moving paper strip of the paper strip recorder 30 to trace a differential indicating reference line r, and any leakage of as little as six ounces in an hour will be accurately indicated by the continuously moving paper strip s on which the line r is marked by pen p. Of course, there are also digital readouts at both the transducer and recorder which can be monitored.

Trapped vapor in the gasoline, which in an "overfill" test system, drives liquid up into the ventpipe and creates inaccuracies and the possibility of leak from the vent pipe, is not a factor in the present system. Moreover, the system is not liquid level-dependent in the sense that liquid level is being measured, and the distance x at the start of each test need not be a predetermined constant.

While one embodiment of the invention has been described in detail, it will be apparent to those skilled in the art that the disclosed embodiment may be modified. Therefore, the foregoing description in all aspects is to be considered exemplary, rather than limiting in any way, and the true scope of the invention is that defined in the following claims.

What is claimed is:

1. A method of detecting leaks in liquid storage tanks and the like having tank bodies with projecting fill and vent pipes, which are connected with a liquid withdrawal system which is normally closed to atmosphere, and are filled only to an extent to leave a top space in the body of the tank above the liquid surface level; the steps of:
   a. filling the space in the body of the tank above the liquid level with a gas under a gaseous pressure greater than atmospheric pressure to maintain a predetermined pressure on the liquid surface in the tank from one end of the body of the tank to the other while maintaining the pipes empty of liquid and isolated from the pressure of the atmosphere;
   b. forcing a continuous stream of bubbles of gas into the lower portion of the liquid in the tank to reflect the resistance to gas introduction as influenced by the composite effect of the pressure of the gas on the said surface and the head of liquid at the level of gas introduction;
   c. bleeding off from the tank the gas bubbles introduced, and
   d. monitoring the gas pressure required to flow a continuous stream of bubbles of the gas at the level of gas introduction, and indicating any variation therein over a test time period.

2. The method of claim 1 wherein the static pressure of the gas in the space above the liquid is balanced as a reference pressure against the pressure required to continuously bubble air, to note any differential variation.

3. The method of claim 2 wherein the pressure differential is translated into an electrical signal which controls a recorder pen and moves it in proportion to the pressure differential.

4. The method of claim 1 wherein the space in the tank above the liquid level is vented to atmosphere in a manner to alleviate any build-up of pressure in the top of the tank beyond the desired test pressure, and to vent volatiles.

5. The method of claim 4 wherein the top of the tank is communicated with a liquid containing bleed regulating standpipe which is open to atmosphere, at a level below the liquid level in the standpipe which permits bubble flow to the atmosphere without pressure buildup in the top of the tank.

6. The method of claim 5 in which the standpipe contains water at a predetermined level.

7. The method of claim 1 wherein sufficient liquid is added to a tank which does not have it to bring the liquid up to near the top, i.e., one to twelve inches from the top, as a first step.

8. The method of claim 1 wherein the level of gas introduction is spaced from the bottom of the tank a depth y substantially equal to the distance x between the surface of the liquid and the top of the tank.

9. A system for detecting leaks in liquid storage tanks and the like, having tank bodies with projecting fill and vent pipes, which systems are connected with a liquid withdrawal system normally isolated from the atmosphere, and are filled only to an extent to leave a top space in the body of the tank above the liquid surface level comprising:
   a. means for filling the space in the body of the tank above the surface with a gas under a pressure greater than atmospheric and maintaining a gaseous pressure on the liquid surface in the tank from one end of the body of the tank to the other, and for maintaining the pipes empty of liquid and isolated from the pressure of the atmosphere;
   b. means, including a tubular part extending into a lower portion of the liquid in the tank, for forcing a continuous stream of bubbles of gas into said lower portion whereby the resistance to gas introduction is influenced by the composite effect of the pressure of the gas on the said surface and the head of liquid at the level of gas introduction;
   c. means for bleeding the gas bubbles introduced from the tank; and
   d. means for monitoring the gas pressure required to flow said continuous stream of bubbles and indicating a variation therein over a test time period.

10. The system of claim 9 wherein said montoring means balances the static pressure of the gas in the space above the liquid as a reference pressure against the pressure required to continuously bubble air, to note any differential variation.

11. The system of claim 9 wherein said bleeding means includes a tubular member communicating the tank space above the surface with an open standpipe containing a level of liquid therein at a level below the surface of the liquid in the standpipe.

12. The system of claim 9 wherein said tubular part introduces said bubbles at a level spaced from the bottom of the tank at a distance y approximately equal to the distance x between the top of the tank and the surface of the liquid therein.

13. The system of claim 9 wherein said bleeding means provides for removal of the bubbles from the gas-filled space in the tank without exposing the tank to atmospheric pressure.

14. A system for detecting leads in incompletely filled liquid storage tanks and the like, incorporating projecting fill and vent pipes, which systems are connected with a liquid withdrawal system normally isolated from the atmosphere, comprising:
   a. means for filling the tank space above the surface of the liquid therein with a gas under a pressure greater than atmospheric pressure and maintaining a gaseous pressure on the said liquid surface, and for maintaining the tank space above the said surface isolated from the pressure of the atmosphere;
   b. means including a tubular part extending into the liquid in the tank for forcing a continuous stream of bubbles of gas into the said liquid whereby the resistance to gas introduction is influenced by the composite effect of the pressure of the gas on the said surface and the head of liquid at the level of gas introduction;
   c. means for bleeding the gas bubbles introduced from the tank without exposing the tank to atmospheric pressure; and
   d. means for balancing the static pressure of the gas in the space above the liquid as a reference pressure against the gas pressure required to flow said continuous stream of bubbles and indicating any differential variation over a time period.

* * * * *